United States Patent [19]
Laurin

[11] 4,064,308
[45] Dec. 20, 1977

[54] ABRASION AND ANTIFOG-RESISTANT OPTICAL ELEMENT

[75] Inventor: Bernard L. Laurin, Ludlow, Mass.

[73] Assignee: American Optical Corporation, Southbridge, Mass.

[21] Appl. No.: 717,065

[22] Filed: Aug. 24, 1976

Related U.S. Application Data

[63] Continuation of Ser. No. 578,793, May 19, 1975, abandoned.

[51] Int. Cl.² .......................... C08J 7/12; G02B 1/10; G02C 7/02; B32B 17/06
[52] U.S. Cl. ................................. 428/410; 350/175R; 351/166; 427/166; 427/168; 427/169; 427/299; 428/412; 428/539; 428/543; 428/913
[58] Field of Search ............. 428/412, 432, 409, 410, 428/500, 539, 543, 913; 427/166, 168, 169, 299; 350/175 R; 351/166; 156/3

[56] References Cited

U.S. PATENT DOCUMENTS

| 2,310,223 | 2/1943 | Eaton et al. | 96/61 R |
| 2,455,936 | 12/1948 | Lowe | 264/299 |
| 3,318,856 | 5/1967 | Deyrup | 526/9 |
| 3,525,636 | 8/1970 | Bofart | 428/432 |
| 3,652,328 | 3/1972 | Dork et al. | 351/166 |
| 3,700,487 | 10/1972 | Crandon et al. | 428/412 |
| 3,840,482 | 10/1974 | Bolto et al. | 260/2.1 R |
| 3,933,407 | 1/1976 | Tu et al. | 50/175 R |
| 3,971,872 | 7/1976 | Le-Boeuf | 428/412 |
| 3,986,997 | 10/1976 | Clark | 428/412 X |
| 4,027,073 | 5/1977 | Clark | 351/166 |

*Primary Examiner*—Harold Ansher
*Attorney, Agent, or Firm*—Alan H. Spencer; Howard R. Berkenstock, Jr.

[57] ABSTRACT

An optical element is provided having a durable abrasion-resistant, antifog coating applied to at least one surface thereof by coating an optical element comprised of an inorganic or organic transparent base with a transparent abrasion-resistant antifog coating consisting of a lightly cross-linked polyvinyl alcohol, the desired degree of cross-linking being obtained by utilizing a combination of zirconium nitrate and formaldehyde as cross-linking agents.

3 Claims, No Drawings

ABRASION AND ANTIFOG-RESISTANT OPTICAL ELEMENT

This is a continuation of application Ser. No. 578,793 filed May 19, 1975 now abandoned.

BACKGROUND OF THE INVENTION

1. Field of the Invention:

The invention is in the field of optical elements based upon either inorganic and organic base elements. Such optical elements as windows, eyeglasses, goggles, face-shields, binoculars and optical instruments are known to be subject to fogging, that is the condensation of moisture on such optical surfaces when these surfaces are cooled below the temperature of the surrounding air. Since the heat transfer or conduction of inorganic glass optical elements is greater than that of an organic glass optical element, the tendency for fogging is generally greater on an inorganic glass optical element. However, under conditions of extreme humidity, even organic glass lenses are subject to fogging or moisture condensation on their surfaces.

2. Description of the Prior Art:

A review of prior art attempts to provide an antifogging substrate is provided in U.S. Pat. No. 3,700,487 wherein an antifogging coating is disclosed for such optical elements as glass, polycarbonate, polymethylmethacrylate, diethylene glycol bis allyl carbonate and copolymers thereof, methylmethacrylate and metal. The teaching of this patent includes a process for the preparation of the surface of the optical element substrate for subsequent coating so that adequate bonding of the antifogging coating can be obtained. Preparation of the surface is achieved by dipping the optical element into a solution of an alkyl titanate or by a hydrolytic surface treatment in which an alcoholic or aqueous caustic such as sodium or potassium hydroxide is applied to the optical element prior to coating with the antifog coating disclosed. Other methods of obtaining adequate adhesion of the antifog coating are disclosed as the application of a bonding coat of polyvinyl butyral or the application of a nylon lacquer sold under the trademark "Milvex 4000" manufactured by General Mills. The antifog coating which is subsequently applied, for instance, to a polycarbonate substrate, consists of polyvinyl alcohol in solution in combination with hydriodic acid as a cross-linking catalyst. The solution pH is approximately 2.3.

In. U.S. Pat. No. 3,484,157, there is disclosed an abrasion-resistant optical element having a directly-adhering, transparent surface coating comprising a vinyl polymer cross-linked with a dialdehyde cross-linking agent. Such dialdehydes as glyoxal, pyruvic aldehyde, 2 hydroxyadipaldehyde or glutaraldehyde can be used.

SUMMARY OF THE INVENTION

A durable abrasion or scratch-resistant, antifog coating is provided for an optical element of an inorganic or organic optical element by the application of a polyvinyl alcohol coating lightly cross-linked with a combination of zirconium nitrate and formaldehyde as cross-linking agents. In the process of the invention, adequate bonding of the antifog coating of the invention to various substrates can be obtained, for instance, by an hydrolytic surface treatment of the optical element surface to be coated in which an aqueous or alcoholic caustic such as sodium or potassium hydroxide is applied thereto. The process of the invention provides unexpectedly improved control of the degree of cure of the polyvinyl alcohol antifog coating wherein a satisfactory balance between the water resistance of the coating, as determined by a test in which the coating is abraded under water, and the antifog resistance of the coating, as determined by a test in which the coated optical element is exposed to high humidity.

DESCRIPTION OF THE PREFERRED EMBODIMENTS

According to the present invention, there is provided a lightly cross-linked polyvinyl alcohol coating on the surface of a transparent base optical element, said coating being applied to said optical element only after the surface of the optical element has been initially treated to provide a permanent bonding layer therebetween. The durable, abrasion-resistant antifog coating of the invention can be applied to an optical element substrate of glass, plastic or metal and the coating provides a permanent antifogging surface layer which is abrasion-resistant as well. The antifog coating can be applied to one or more surfaces of an optical element, for instance, to one or more surfaces of a lens. The base optical element can be a polymeric substrate formed of polycarbonates exemplified by the product sold by General Electric Company as "Lexan" which is a poly -(4,4'-dioxydiphenyl-2,2-propane carbonate) of the formula:

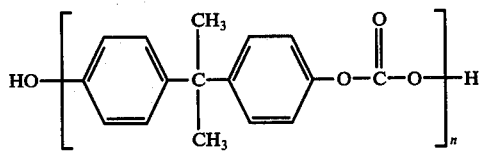

$n$ = about 50 to about 200. The polymer is prepared by condensing bisphenol-A (4,4'-dihydroxy diphenyl-2,2-propane) with phosgene, in the presence of a hydrogen chloride acceptor such as an amine base. Other embodiments of the base optical element substrate are, but are not limited to, allyl diglycol carbonate methyl methacrylate, styrene copolymer, cellulose esters such as cellulose acetate and cellulose acetate butyrate.

In general, the practice of the invention provides for initially preparing the surface of a substrate to insure adequate bonding of the antifog coating, for instance, by treating the surface with an aqueous or alcoholic caustic such as sodium or potassium hydroxide so as to cause a degree of hydrolysis in the surface of the base optical element. Other adhesion promoting treatments can also be used.

The hydrolysis treatment can be applied to the base optical element by dipping the base optical element into a solution of an aqueous or alcoholic caustic containing an alkali metal hydroxide such as sodium or potassium hydroxide present at a concentration of about 10 percent to about 20 percent. The treatment can be conducted at a temperature of about 20° C to about 70° C and the time in which the base optical element is exposed to said caustic can be about 1 hour to about 24 hours. The base optical element subsequent to treatment in said caustic is rinsed in water and dried at a temperature of about 20° C to about 50° C.

The polyvinyl alcohol which is applied to the base optical element of the invention is prepared as a solution in water or water and an alcohol having 2 to 6 carbon atoms present in a proportion of about 20 percent to about 60 percent. The concentration of the polyvinyl alcohol solution can be about 3 percent to about 5 percent. It is desirable to include a surface active agent or wetting agent in the solution of polyvinyl alcohol to provide more complete solution of the polyvinyl alcohol and optimum wetting of the polyvinyl alcohol solution when this is applied to the base optical element to be coated. The surface active agent can be a non-ionic, cationic or anionic type material such as are well-known to those skilled in the art.

The polyvinyl alcohol can be either the so-called partially hydrolyzed or fully hydrolyzed commercially available grade, said polyvinyl alcohol being derived from polyvinyl acetate by hydrolysis so as to produce the desired proportion of polyvinyl alcohol. Polyvinyl alcohols are produced commercially in grades varying between 65 and 98 percent degree of hydrolysis of the polyvinyl acetate starting material. The fully hydrolyzed grade is preferred for use in the practice of the invention. Polyvinyl alcohol is also available commercially in various molecular weights varying between about 14,000 molecular weight (weight average) to about 115,000 molecular weight (weight average).

It has been found that the commercially available grades of polyvinyl alcohol having a weight average molecular weight of at least about 85,000 and higher can be utilized in the practice of the invention. With the low molecular weight grades, a higher concentration of polyvinyl alcohol in the coating solution can be obtained as compared to the higher molecular weight grades of polyvinyl alcohol. The molecular weight of the polyvinyl alcohol is important in the process of the invention primarily as a means of controlling the viscosity of the polyvinyl alcohol solution and thereby the coating thickness of the durable, abrasion-resistant antifog coating on the optical element of the invention.

In the process of the present invention, the base optical element is coated with a dried polyvinyl alcohol coating at a thickness of about 0.5 to about 3 microns. Although thinner or thicker coatings can be applied which will provide durability as well as resistance to abrasion and fogging, best results have been obtained by the application of coatings within said range of thickness.

The process of the present invention provides for an unusual and unexpected control of the degree of cross-linking of the polyvinyl alcohol which is required to obtain the desired dual properties of (1) resistance to removal of the coating upon wet abrasion and (2) resistance to fogging of the coated surface upon exposure to an atmosphere of high humidity. The desired properties of the coated base optical element are obtained by curing the coating to get the desired water insolubility of the coating without losing the antifog property which depends upon the partial water solubility of the coating. This is obtained in the process of the invention by utilizing as cross-linking agents a combination of zirconium (zirconyl) nitrate and formaldehyde.1 It has been found that the use of zirconyl nitrate alone in varying amounts equal to or over the total amount of an effective combination of zirconyl nitrate and formaldehyde (on a weight basis) provides an unsatisfactory degree of water insolubility such that the water solubility is excessive resulting in an unsatisfactory product. On the other hand, the use of a comparable amount of formaldehyde alone has been found to provide too small a degree of cross-linking. When a proportion of formaldehyde equal to an effective amount of zirconyl nitrate and formaldehyde in the coating compositions of the invention was used, the product, even when it is heated excessively, retains excessive water solubility and the coating does not exhibit antifog properties. In addition, when zirconyl nitrate is used as the only cross-linking agent in the coating compositions of the invention, an objectionable brown color is obtained upon heating the coating to the extent required to provide the desired degree of water insolubility. When formaldehyde is used as the only cross-linking agent, it is found that the coating develops a cloudiness or haze upon contact with moisture. The substitution of a prior art dialdehyde cross-linking agent such as glyoxal has resulted in inadequate antifog resistance.

The desired wet abrasion and antifog properties of the coated optical elements of the invention can be determined utilizing test procedures as follows: For evaluation of wet abrasion, a sample flat safety lens is abraded when totally submerged in distilled water utilizing a one inch diameter felt abrading pad of the required coarseness. A weight is used to press the felt pad against the lens to be evaluated so that a total of 5 pounds per square inch is obtained on the surface of the lens. The pad is attached to an arm which is made to oscillate utilizing an electric motor with each oscillation being counted mechanically. Satisfactory wet abrasion is obtained when the coated sample is substantially unaffected after 300 wet abrasion cycles.

For evaluation of antifogging properties of the coated optical elements of the invention, a lens under evaluation is placed in a refrigerator for 20 minutes in which the temperature is maintained at a temperature of about 35 to about 40° F. Subsequently, the lenses are placed in an oven maintained at a temperature of about 105° F. The oven designed for this test is fitted with a slot in the top of the oven to allow the lens to be dropped into the oven without reducing the temperature therein. The front and back of the oven are fitted with windows and a lamp is placed in the oven so that an observer can look through the windows to observe fogging. A dish of water is maintained on a shelf in the oven and compressed air is bubbled through the water to provide a relative humidity in the oven of about 45 to about 55 percent. Satisfactory passage of 3 cycles of cooling and heating under the above conditions are required for satisfactory antifogging properties.

In the process of the invention a polyvinyl alcohol solution is made up to a concentration of between 3 and 5 percent by weight polyvinyl alcohol. The curing agents of the invention are present in the proportion of a total of about 0.2 percent by weight to a total of about 0.8 percent by weight. The proportion of zirconyl nitrate to formaldehyde can be about 1 to about 3 to about 3 to about 1. The zirconyl nitrate is available as the salt containing 37 percent water of hydration while the formaldehyde is available as a 37 percent active solution. It is to be understood that the above proportions of curing agent are based on a solids basis rather than a wet basis. The coating solution has a viscosity as measured by a Brookfield Viscometer at 25° C of about 100 cps to about 200 cps.

The polyvinyl alcohol solution is applied to the optical element of the invention preferably by dipping the optical element into the coating solution under standard conditions of room temperature and relative humidity such as 25° C and 40 percent relative humidity. The rate at which the optical element is withdrawn from the solution can be important in insuring the uniform distribution of the coating on the optical element of the invention and generally it is desirable to provide a withdrawal rate for removing the substrate from the coating solution which is on the order of about ½ to about 3 inches per minute. The coating subsequent to application is dried at room temperature for a period of about 15 minutes to about 1 hour and subsequently cured at a temperature of about 100° C to about 175° C. The time for the curing operation and temperature are important in that too much time can result in an excessive degree of cross-linking such that the coating exhibits little or no antifog properties while too little cure time can result in a coating having too little resistance to wet abrasion. Thus, the time for cure can be about 2 minutes to about 30 minutes depending upon the temperature at which the coating is cured. A suitable time and temperature for cure is as follows: 121° C for 30 minutes.

The following examples illustrate the various aspects of the invention but are not intended to limit it. Where not otherwise specified throughout this specification and claims, temperatures are given in degrees centgrade and parts are by weight.

EXAMPLE 1

An antifog coating according to the invention was applied to an optical element of allyl diglycol carbonate formed by casting a base lens element according to procedures known in the prior art. Adequate bonding of the subsequently applied antifog coating of the invention to the allyl diglycol carbonate lens is provided by dipping said lens in an aqueous solution of sodium hydroxide maintained at a temperature of 23° C and having a solids content of 15 percent. Subsequent to immersion of the lens in the solution of sodium hydroxide, the lens was air dried at 20° C by blowing air under pressure onto the lens and then the lens was dipped into a solution of polyvinyl alcohol prepared by dissolving 45 grams of polyvinyl alcohol sold under the trademark of "Gelvatol 1-90" by Monsanto Chemical Co. in a mixture of 426.5 grams of demineralized water and 315 grams of ethanol. The solution is heated to a temperature of 100° C while under rapid agitation. The agitation is maintained until the polyvinyl alcohol is completely dissolved which takes about 20–30 minutes. Water lost by evaporation is replaced and the resulting solution is then filtered while still hot through a 14 micron pressure filter. Thereafter, approximately 5 drops of a nonionic surface active agent sold under the trademark "Triton X-100: by Rohm and Hass Company is added to the mixture to provide about 0.03 percent of surface active agent.

To the above prepared polyvinyl alcohol solution there is added 200 grams (0.4 percent of the total solution) of zirconium nitrate as a 2 percent solids solution of the salt containing 37 percent water of hydrolysis and 0.5 percent of formaldehyde on an active basis from the commercially obtainable 37 percent active solution. Thus, a total of 4.0 grams of zirconium nitrate is present together with 5.0 grams of formaldehyde as a 37 percent active solution. The solution pH was 3.4 and the viscosity was 180 cps when measured on a Brookfield Viscometer at 25° C subsequent to the addition of the zirconium nitrate and formaldehyde solutions.

The polyvinyl alcohol solution prepared above was applied to the allyl diglycol carbonate lens by a dipping operation carried out at a temperature of 25° C and a relative humidity of 40 percent. The withdrawal rate during the dipping operation was 1½ inches per minute. The curing temperature was 121° C and the time was 30 minutes.

A durable, abrasion-resistant antifog coating was thus obtained on an allyl diglycol carbonate substrate.

EXAMPLE 2 (control)

A polycarbonate sold under the trademark "Lexan" was molded into a safety goggle lens and was provided with a coating to provide adequate bonding of the antifogging coating by applying a 10 percent solution in ethanol of gamma-aminopropyltriethoxysilane. The polycarbonate lens was coated by dipping into the solution. The substrate was then air dried and rinsed with water which was subsequently dried using compressed air. Following the process of Example 1, a coating was applied by dipping the lens into a polyvinyl alcohol solution prepared as in Example 1 except that instead of the use of zirconium nitrate and formaldehyde as curing agents for the polyvinyl alcohol solution, 1 percent of glyoxal was substituted therefor. The polyvinyl alcohol coating was applied and cured at 121° C for 30 minutes in accordance with the procedure of Example 1.

Upon evaluation of this coating by testing for antifog resistance in accordance with the procedure outlined above, the coating fails the first cycle by exhibiting fogging. The coating, however, passed the previously described wet abrasion test without failure after 300 cycles.

EXAMPLE 3 (control)

The procedure and proportions of Example 2 were used except that 0.7 percent zirconyl nitrate was used as the only curing agent in the polyvinyl alcohol coating solution.

Upon coating and curing, the polycarbonate lens in accordance with the procedure of Example 1, an objectionable brown color was obtained.

Upon evaluation for antifog properties, the coated lens was found to fail the first cycle of the above-described test, however, the coated lens passed the above-described wet abrasion test showing no failure after 300 cycles.

EXAMPLE 4 (control)

The procedure and proportions utilized in Example 2 were used with the exception that 1 percent formaldehyde was used as the only cross-linking agent in the polyvinyl alcohol coating solution. Upon evaluation of the coated samples made in this manner, it was found that satisfactory antifog properties were obtained; the sample passed three cycles of the above test for antifog resistance. In addition, the coated sample passes the wet abrasion test without failure after 300 cycles, however, the coating exhibits an objectionable haze upon contact with water.

EXAMPLE 5

In accordance with the procedure of Example 1, a silicate based glass lens was provided with an abrasion-resistant antifog coating by first dipping said lens in an aqueous solution of sodium hydroxide maintained at a temperature of 23° C and having a solids content of 15 percent. Subsequent to immersion of the lens in the solution of sodium hydroxide, the lens was air dried at 20° C by blowing air under pressure onto the lens. The lens was then dipped into a solution of polyvinyl alcohol prepared in accordance with the procedure of Example 1. A durable, abrasion-resistant antifog coating was thus obtained on a silicate glass substrate.

EXAMPLE 6

The procedure and proportions of Example 2 were repeated except that the curing agents of Example 1 were substituted for glyoxal and used in the same proportions as shown in Example 1.

A durable, abrasion-resistant antifogging coating was obtained on a polycarbonate safety goggle lens.

While this invention has been described with reference to certain specific embodiments, it will be recognized by those skilled in the art that many variations are possible without departing from the scope and spirit of the invention.

I claim:

1. An abrasion-resistant optical element comprising a transparent base element of glass or plastic having a transparent, abrasion-resistant, antifogging coating on at least one surface thereof comprising a cross-linked polyvinyl alcohol wherein said polyvinyl alcohol is cross-linked with a curing agent which is composed of 1 to 3 parts by weight of zirconium nitrate and 3 to 1 parts by weight of formaldehyde, said curing agent constituting 0.2 to 0.8 percent by weight, on a solids basis, of the total weight of polyvinyl alcohol and curing agent.

2. The optical element of claim 1 wherein said transparent base element is a polycarbonate.

3. The optical element of claim 1 wherein said transparent base element is allyl diglycol carbonate.